Patented Nov. 10, 1953

2,658,887

UNITED STATES PATENT OFFICE 2,658,887

PROCESS FOR FORMING UREA COMPLEXES

George B. Arnold, Glenham, and James K. Truitt and Howard V. Hess, Beacon, N. Y., assignors to The Texas Company, New York, N. Y., a corporation of Delaware No Drawing. Application February 11, 1950, Serial No. 143,838

4 Claims. (Cl. 260—96.5)

This invention relates to the formation of urea complexes by contact of an organic mixture with urea in a medium which possesses low hydrocarbon solubilities. More particularly, this invention discloses a method for catalyzing the formation of urea complexes when the complexing agent is used in an aqueous solution or slurry.

This invention involves the discovery that formation of urea-hydrocarbon complexes by contact of a mixture of organic compounds with urea in a medium such as water which possesses a low hydrocarbon solubility, is facilitated by the presence of added complex. The presence of added complex during contact of an organic mixture with urea acts as a promoter for the formation of complex. Advantageously, the added complex contains organic constituents similar in composition to those present in the mixture to be treated. The simplest method of maintaining a constant quantity of complex in the contacting zone consists of recycling a portion of the complex. The process of the invention is particularly useful when water is employed as the urea medium.

It has recently been discovered that urea forms a solid complex with certain types of organic compounds. The class of compounds which complex with urea comprises normal aliphatic hydrocarbons containing at least six carbon atoms, terminal-substituted normal aliphatic hydrocarbons containing at least six carbon atoms, such as n-decanol and n-dodecylbenzene and some methyl-substituted n-aliphatic hydrocarbons. This discovery provides a very useful tool in the resolution of organic mixtures, such as petroleum fractions and the oil product obtained by catalytic conversion of carbon monoxide and hydrogen. Urea complexing is useful both in the isolation of specific compounds, and in the removal of undesirable components from a petroleum fraction. The main commercial usefulness of urea complexing at the present time lies in the dewaxing of petroleum fractions, such as gas oil and lubricating oils, to produce low pour products. Low pour diesel fuels are in demand as jet fuels and for cold weather operation of diesel engines; refrigerator oils characterized by low Freon haze are required in air-conditioning and refrigeration equipment.

Various procedures have been proposed for effecting formation of urea complexes with organic compounds. It has been proposed that complex formation be effected by contacting an organic mixture with a saturated or supersaturated solution of urea in a polar solvent, such as aliphatic alcohols, aliphatic ketones, water, etc. Complex formation is also effected by contacting an organic mixture with a slurry of urea in a polar solvent. Complex formation is also effected by contacting an organic mixture with a fixed bed of urea; in procedures of this sort the urea is advantageously used in conjunction with a particulate solid, such as Filter Cel, alumina, silica, sand, etc. In all these various techniques for effecting complex formation, the presence of a polar compound, such as water, an aliphatic alcohol or an aliphatic ketone expedites complex formation.

The discovery that urea complex formation can be effected by contact of an organic mixture with an aqueous solution or slurry of urea has resulted in substantial economies in the application of urea complexing to commercial operations. Since aqueous solution is readily separated from the organic mixture, and since residual water is simply removed from the organic mixture, contamination of organic mixture, such as dewaxed gas oil is obviated. The aqueous solution employed for urea complexing should be substantially saturated and is preferably supersaturated or an aqueous slurry of urea. Dilute aqueous solutions are not effective for complex formation because the complex is decomposed by the extra-dissolving power of a dilute aqueous urea solution.

The process of this invention is particularly useful when water is employed as the urea solvent. However, the presence of added complex during contact of urea with the organic mixture results in more complete and rapid complex formation when other urea mediums which possess a low hydrocarbon solubility are used. Thus, the invention is useful when low molecular weight alcohols such as methanol and ethanol or aqueous solutions thereof are employed as urea mediums.

In accordance with the process of this invention, complex formation in a medium which possesses low hydrocarbon solubility is substantially enhanced by the presence of added complex. Hereafter, the invention will be illustrated by complex formation by contact with urea in aqueous medium. The improvement is particularly noticeable when the organic mixture, which is subjected to complex formation, comprises heavier oil stocks, such as lubricating oil fractions. For example, in the dewaxing of a lubricating oil fraction with an aqueous slurry of urea, a Freon haze of −65° F. was obtained with complex recycle, whereas the best product obtained under similar dewaxing conditions without complex recycle had a Freon haze of −20° F. Substantial improvement is also realized in the formation of complexes with lighter molecular weight oils, such as gas oils, although the improvement in such instances is not as striking as when the charge stock is a heavier oil. The presence of complex during contacting of the charge material with urea in aqueous medium results in more complete and rapid reaction between urea and complex-forming compounds present in the mixture.

The most practicable procedure for effecting complex formation with urea in the presence of added complex involves recycle of separated complex to the zone wherein the organic mixture is contacted with urea. During initial contact of aqueous urea with the organic mixture, complex from an extraneous source can be added to promote complex formation. An alternative "starting up" procedure involves recycle of products during the period of initial contact.

Although recycle of complex is the preferred procedure for effecting complex formation in the presence of added complex, the invention also contemplates addition of complex from an external source. Added complex from an external source can be composed of urea and a straight chain aliphatic hydrocarbon containing at least six carbon atoms or a terminally-substituted normal aliphatic hydrocarbon containing at least six carbon atoms. Advantageously, the organic component of a complex added from an external source is of similar composition to the complex-forming materials in the organic mixture to be treated.

When complex recycle is employed to provide the presence of added complex during the formation of complex by contacting an organic mixture with urea in aqueous medium, it has been discovered that excellent results are obtained with complex recycle in the amount of 5 to 40 pounds of recycle per barrel of oil treated. A recycle ratio of about 10 to 30 pounds of complex per barrel of oil treated is particularly effective.

Normal methods of complex formation and complex separation are employed in the process of this invention. It is preferred to use slurry of urea although saturated and super-saturated aqueous solutions may also be employed. Advantageously, vigorous agitation is used to effect good contact of urea with the organic mixture.

The process of this invention is particularly effective when solubilizing solvents are employed in conjunction with complex recycle in the formation of urea complexes. The dewaxing of lubricating oils and gas oil by aqueous urea is enhanced when complex recycle is employed in conjunction with the use of solvents which enhance the miscibility of the aqueous phase with the organic mixture. Solvents which increase the miscibility of the two phases are ketones, such as acetone, methyl ethyl ketone and methyl isobutyl ketone, alcohols, such as ethanol, butanol and pentanol and esters, such as ethylacetate, methylpropionate and propylacetate. Heavy lubricating stocks in particular are dewaxed in optimum manner by aqueous urea in the presence of a solubilizing solvent of the type described employing complex recycle of this invention.

Urea complexes are decomposed at elevated temperature over 160° F. and as a matter of fact, substantial decomposition occurs at temperatures over 150° F. Accordingly, complex formation is effected at temperatures between 0 and 150° F. and preferably at temperatures between 70 and 140° F., thereby eliminating the necessity of refrigeration. Atmospheric temperature has been found to be a convenient, effective temperature at which to contact urea with a mixture of organic compounds. Apparently, complex formation is not critical to pressure so that pressures ranging from subatmospheric to super-atmospheric pressures up to and above 20 atmospheres may be employed. However, complex formation is ordinarily effected at atmospheric pressure.

Separation of the complex from the organic mixture is effected by filtration, centrifugal separation or settlers. Rotary filters, such as are employed in solvent dewaxing, are useful in effecting continuous filtration of complex from reaction mixture. Centrifugal separation has also proven very useful in the removal of complex in continuous operation. Settlers are used in batch operation. The process of the present invention is accompanied by substantial improvements no matter what method of contacting or separation procedure is employed.

The accompanying examples illustrate the advantages realized in the process of this invention. In Examples I to IV, there is shown the effect of dewaxing of turbine oil with and without complex recycle; Examples V and VI illustrate dewaxing of gas oils with aqueous urea with and without complex recycle.

Example I

A turbine oil, whose Freon haze was above −20° F. was contacted in a reaction vessel with an aqueous slurry of urea in the proportion of one volume of slurry per ten volumes of oil. The aqueous slurry contained 35 pounds of urea per barrel of oil over and above the urea required to saturate the aqueous solution at about 75° F. Separated complex was recycled to the reaction vessel in the proportion of about 28 pounds of complex per barrel of oil treated. The temperature was maintained between about 71 and 74° F. in the reaction vessel and the total contact time was 1¼ hours. The filtrate oil after separation of complex had a Freon haze of −60° F.

Example II

A turbine oil whose Freon haze was above −20° F. was contacted in a reaction vessel with an aqueous slurry of urea in the proportion of one volume of slurry per 10 volumes of oil. The aqueous slurry contained 35 pounds of urea per barrel of oil over and above the urea required to saturate the aqueous solution at about 80° F. Separated complex was recycled to the reaction vessel in the proportion of about 28 pounds of complex per barrel of oil treated. The temperature was maintained between about 82 and 84° F. in the reaction vessel. The stirring time was one half hour and the total contact time was one hour. The filtrate oil after separation from complex has a Freon haze of −55° F.

Example III

A turbine oil whose Freon haze was above −20° F. was contacted in a reaction vessel with a slurry of urea in the proportion of one volume of slurry per 10 volumes of oil. The aqueous slurry contained 35 pounds of urea per barrel of oil over and above the urea required to saturate the aqueous solution at about 80° F. The separated complex was recycled to the reaction vessel in the proportion of about 28 pounds of complex per barrel of oil treated. The temperature was maintained between about 82 and 84° F. in the reaction vessel and the total contact time was two hours; total stirring time was one hour. The filtrate oil after separation of complex has a Freon haze of —65° F.

*Example IV*

A turbine oil whose Freon haze was above —20° F. was contacted in a reaction vessel with an aqueous slurry of urea in the proportion of one volume of slurry per two volumes of oil. The aqueous slurry contained 29 pounds of urea per barrel of oil over and above the urea required to saturate the aqueous solution at about 80° F. There was no complex recycle in this example. The temperature was maintained at about 82 and 84° F. in the reaction vessel and the total contact time was 17½ hours; total stirring time was one hour. The filtrate oil after separation of complex had a Freon haze above —20° F.

*Example V*

A gas oil which had a pour point of 25° F. was contacted in a reaction vessel with an aqueous slurry of urea in the proportion of one volume of slurry to 10 volumes of oil. The aqueous slurry contained 140 pounds of urea per barrel of oil over and above the urea required to saturate the aqueous solution at about 80° F. The separated complex was recycled to the reaction vessel in the proportion of about 28 pounds of complex per barrel of oil treated. The temperature was maintained at about 80° F. and the total contact time, during all of which the reaction mixture was stirred, was 4 hours. There was obtained by filtration a gas oil which had a pour point of —30° F.

*Example VI*

A gas oil which had a pour point of 25° F. was contacted in a reaction vessel with an aqueous slurry of urea in the proportion of one volume of slurry to 10 volumes of oil. The aqueous slurry contained 140 pounds of urea per barrel of oil over and above the urea required to saturate the aqueous solution at about 80° F. There was no complex recycle in this example. The temperature was maintained at about 80° F. and the reaction vessel total contact time was 18 hours; total stirring time was 4 hours. There was obtained by filtration a gas oil which had a pour point of 10° F.

It will be observed that refrigerator oils of superior quality result from dewaxing lubricating oil stock with aqueous urea in the presence of added complex. The refrigerator oils obtained employing complex recycle in Examples I, II and III are characterized by a Freon haze of between —55 to —65° F. whereas the refrigerator oil obtained under similar dewaxing conditions without complex recycle in Example IV exhibited substantially no improvement in Freon haze over the charge oil. It is noteworthy that substantially no improvement in Freon haze was obtained without complex recycle even though the total contact time was 17½ hours as contrasted with the 1 to 2 hour contact times employed in Examples I, II and III. The substantial improvement in the dewaxing of gas oils obtained employing the process of this invention is also significant; as a result of dewaxing with an aqueous slurry of urea employing complex recycle, a gas oil having a pour point of —30° F., an improvement of 55° F., is obtained in Example V; as contrasted with this, the dewaxing of a gas oil of similar wax content under similar conditions without complex recycle yielded a gas oil of plus 10° F., which is only a 15° F. improvement.

Although the foregoing examples all illustrate the process of the invention employing an aqueous slurry of urea in the dewaxing of lubricating oil, it is to be understood that the invention works equally as well when urea is dispersed in other mediums possessing low hydrocarbon solubility.

Obviously, many modifications and variations of the invention, as hereinbefore set forth, may be made without departing from the spirit and scope thereof, and therefore only such limitations should be imposed as are indicated in the appended claims.

We claim:

1. In the formation of urea complexes by contact of a hydrocarbon mixture containing complex-forming constituents with urea in a medium possessing low solubility in said hydrocarbon mixture, the improvement which comprises effecting said contact at a temperature below 150° F. in the presence of a complex consisting of urea and an aliphatic hydrocarbon containing a straight chain of at least six carbon atoms, and being of different composition than the complex-forming constituents present in said hydrocarbon mixture, said complex being obtained from a source external to said urea-hydrocarbon mixture.

2. The improvement according to claim 1 in which water is employed as the urea medium.

3. The improvement according to claim 1 in which a low molecular weight alcohol is employed as the urea medium.

4. The improvement according to claim 1 in which a lubricating oil is dewaxed by contact with urea in the presence of a complex comprising urea and normal hydrocarbons of substantially lower molecular weight than lube oil hydrocarbons.

GEORGE B. ARNOLD.
JAMES K. TRUITT.
HOWARD V. HESS.

References Cited in the file of this patent

UNITED STATES PATENTS

| Number | Name | Date |
|---|---|---|
| 2,189,128 | Breth et al. | Feb. 6, 1940 |
| 2,253,638 | McKennon | Aug. 26, 1941 |
| 2,499,820 | Fetterly | Mar. 7, 1950 |
| 2,549,372 | Fetterly | Apr. 17, 1951 |

FOREIGN PATENTS

| Number | Country | Date |
|---|---|---|
| 17,339 of 1947 | Australia | Apr. 16, 1948 |

OTHER REFERENCES

Bengen, Experientia 5, part 5, page 200 (May 15, 1949).

Zimmershied et al., J. A. C. S., vol. 71, page 2947 (Aug. 1949).